United States Patent Office 2,746,951
Patented May 22, 1956

2,746,951

PYRIMIDINE AZO DYESTUFFS

Karl Taube, Leverkusen-Bayerwerk, Germany, assignor to Farbenfabriken Bayer Aktiengesellschaft, Leverkusen, Germany, a corporation of Germany No Drawing. Application April 30, 1952,
Serial No. 285,303

Claims priority, application Germany May 7, 1951

8 Claims. (Cl. 260—154)

The present invention relates to new azo dyestuffs and to a method of making the same; more particularly it relates to azo dyestuffs corresponding to the general formula:

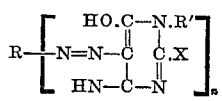

In this formula R stands for the radical of a diazo or tetrazo compound of the benzene or naphthalene series, R' stands for hydrogen, alkyl or aryl, X stands for —OH, —SH, —NH$_2$ or —NH.CN, and $n$ means 1 or 2.

The invention further relates to the metal complex compounds of such azo dyestuffs corresponding to the above general formula, as form metal complex compounds on account of their constitution i. e. if the radical R bears a metal complex forming group in ortho-position to the —N=N—bridge.

The new azo dyestuffs which according to the above formula are mono- and disazo dyestuffs, can be obtained by coupling diazo or tetrazo compounds of the benzene or naphthalene series with derivatives of 4-hydroxy-6-imino-pyrimidine which can be represented by the formula:

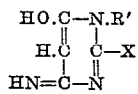

wherein R' and X have the same meaning as above. Such derivatives of 4-hydroxy-6-imino-pyrimidine are e. g. 2,4-dihydroxy-6-imino-pyrimidine, 3 - phenyl-2,4-dihydroxy-6-imino-pyrimidine, 3-methyl-2,4-dihydroxy-6-imino-pyrimidine, 2 - thiol-4-hydroxy-6-imino-pyrimidine, 3-phenyl-2-thiol-4-hydroxy-6-imino-pyrimidine, 2 - cyanamino - 4 - hydroxy-6-imino-pyrimidine. In case the diazo or tetrazo compounds used contain in ortho-position to the diazotized amino group or groups a metal complex forming group e. g. a hydroxy group, alkoxy group or a carboxylic group, the mono- or disazo dyestuffs thus obtained may be converted into their metal complex compounds by known methods.

According to the substitution or non-substitution of the diazo or tetrazo components by sulfonic and/or carboxylic acid groups the new dyestuffs are suited for dyeing wool, cotton, fibres of regenerated cellulose, paper or as pigment dyestuffs. The new dyestuffs yield on the named fibrous materials full and clear yellow shades of good fastness to alkali and acid. Though it was known that barbituric acid can couple to form azo dyestuffs, it could not be foreseen that also its derivatives of the type used according to the present invention would couple and yield dyestuffs of the mentioned qualities.

The following examples illustrate the invention, without, however, limiting it thereto.

*Example 1.*—21.7 grams (=1/10 mol) of 1-aminobenzene-2-carboxylic-5-sulfonic acid are stirred in 200 cc. of ice-water with 25 cc. of technical hydrochloric acid and diazotized with 6.9 grams of sodium nitrite. The disazo compound is added to a solution of 12.7 grams (=1/10 mol) of 2,4-dihydroxy-6-iminopyrimidine in 500 cc. of water and 30 grams of sodium carbonate. The yellow monoazo dyestuff thus formed is separated by adding sodium chloride, isolated and dried. It dyes wool clear yellow shades. The dyestuff corresponds as free acid to the formula:

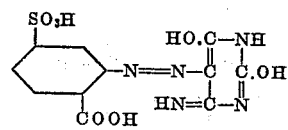

*Example 2.*—12.7 grams (=1/10 mol) of 2,4-dihydroxy-6-imino-pyrimidine are dissolved in 500 cc. of water with 30 grams of sodium carbonate, and 25 grams (=1/10 mol) of the diazo compound of 1-amino-2-hydroxynaphthalene-4-sulfonic acid are added. The monoazo dyestuff thus formed is isolated and converted into the chromium complex compound by refluxing it with chromium acetate in acetic acid solution. The chromium-containing dyestuff is isolated in the usual manner and dyes wool from the sulfuric acid bath clear bluish-red shades. The chromium-free dyestuff corresponds as free acid to the formula:

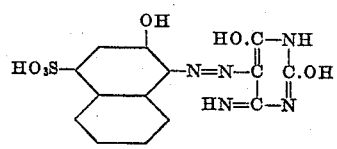

*Example 3.*—40.2 grams (=1/10 mol) of 3,3'-diaminodiphenyl urea-4,4'-disulfonic acid are tetrazotized in 500 cc. of water with 50 cc. of technical hydrochloric acid and 13.8 grams of sodium nitrite. The tetrazo solution is run into a solution of 30.4 grams (=2/10 mol) of 4-hydroxy-6-imino-2-cyanamino-pyrimidine in 500 cc. of water and 60 grams of sodium carbonate. The diazo dyestuff is isolated and dried in the usual manner and dyes cotton and fibres of regenerated cellulose clear greenish-yellow shades of very good neutral and alkaline dischargeability. This disazo dyestuff corresponds as free acid to the formula:

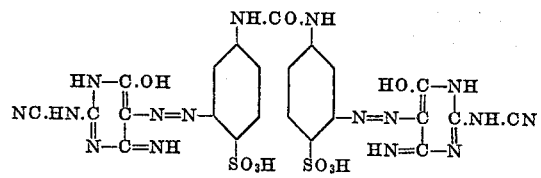

*Example 4.*—21.7 grams (=1/10 mol) of 1-aminobenzene-2-carboxylic-4-sulfonic acid are stirred into 200 cc. of ice-water with 25 cc. of technical hydrochloric acid and diazotized with 6.9 grams of sodium nitrite. The diazo compound is run into a solution of 15.2 grams (1/10 mol) of 4-hydroxy-6-imino-2-cyanaminopyrimidine in 500 cc. of water and 30 grams of sodium carbonate. The monoazo dyestuff is salted out by means of sodium chloride, isolated and dried, and is obtained as a yellow powder which dyes paper from aqueous solution very clear greenish-yellow shades fast to light. The dyestuff corresponds as free acid to the formula:

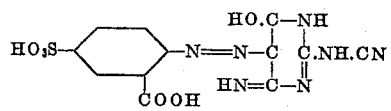

A dyestuff of similar properties is obtained by using 1-aminobenzene-2-carboxylic-5-sulfonic acid instead of 1-aminobenzene-2-carboxylic-4-sulfonic acid.

*Example 5.*—25.3 grams (=1/10 mol) of 1-aminobenzene-2,5-disulfonic acid are diazotized in 250 cc. of ice-water with 25 cc. of hydrochloric acid and 6.9 grams of sodium nitrite. The diazo solution is run into 20.3 grams (=1/10 mol) of 3-phenyl-2,4-dihydroxy-6-iminopyrimidine in 300 cc. of water and 30 grams of sodium carbonate. The monoazo dyestuff is isolated in the usual manner and dyes wool yellow shades. The dyestuff corresponds as free acid to the formula:

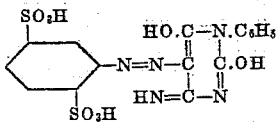

I claim:
1. Azo dyestuffs of the general formula

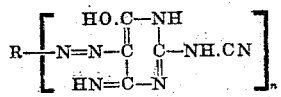

wherein R stands for a radical of the benzene series bearing at least one substituent selected from the group consisting of —SO₃H, —COOH and alkali salts thereof, and n stands for an integer from 1 to 2, inclusive.

2. Azo dyestuffs of the general formula

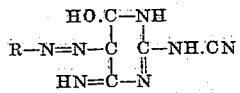

wherein R stands for a radical of the benzene series bearing at least one substituent selected from the group consisting of —SO₃H, —COOH and alkali salts thereof.

3. Azo dyestuffs of the general formula

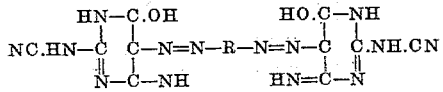

wherein R stands for a radical of the benzene series bearing at least one substituent selected from the group consisting of —SO₃H, —COOH and alkali salts thereof.

4. The monoazo dyestuff corresponding as free acid to the formula:

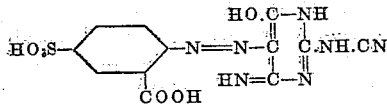

dyeing paper very clear greenish yellow shades fast to light.

5. The monoazo dyestuff corresponding as free acid to the formula:

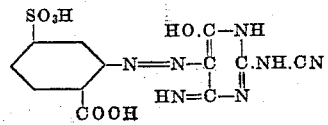

dyeing paper very clear greenish yellow shades fast to light.

6. The monoazo dyestuff corresponding as free acid to the formula:

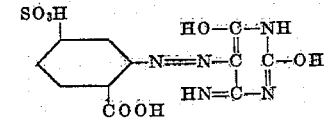

7. The disazo dyestuff corresponding as free acid to the formula:

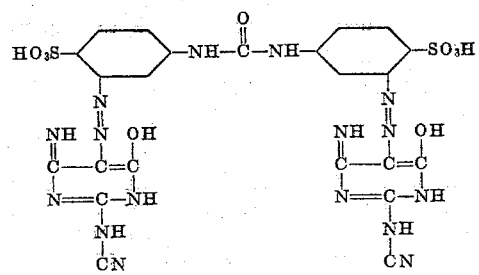

8. The monoazo dyestuff corresponding as free acid to the formula:

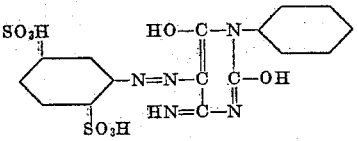

References Cited in the file of this patent

UNITED STATES PATENTS

| | | |
|---|---|---|
| 2,140,536 | McNally et al. | Dec. 20, 1938 |
| 2,578,290 | Dickey et al. | Dec. 11, 1951 |

FOREIGN PATENTS

| | | |
|---|---|---|
| 257,797 | Great Britain | Sept. 9, 1926 |